US006599058B1

(12) United States Patent
Arnold (10) Patent No.: US 6,599,058 B1
(45) Date of Patent: Jul. 29, 2003

(54) LANDFILL LEACHATE COLLECTION APPARATUS

(76) Inventor: John Phillip Arnold, 5333 NW. 35th Dr., Gainesville, FL (US) 32653

( * ) Notice: Subject to any disclaimer, the term of this patent is extended or adjusted under 35 U.S.C. 154(b) by 0 days.

(21) Appl. No.: 09/570,117

(22) Filed: May 12, 2000

(51) Int. Cl.$^7$ .............................. B09B 1/00; B65D 90/24
(52) U.S. Cl. .......................... 405/129.85; 405/129.57; 210/170
(58) Field of Search .................. 405/129.45, 129.5, 405/129.57, 129.85, 129.95; 210/170

(56) References Cited

U.S. PATENT DOCUMENTS

| | | | | |
|---|---|---|---|---|
| 4,350,461 A | | 9/1982 | Valiga et al. ........... 405/129.57 |
| 4,388,357 A | * | 6/1983 | Luebke ..................... 405/36 X |
| 4,451,173 A | | 5/1984 | Watson et al. ................ 405/53 |
| 4,543,013 A | | 6/1984 | Wagner et al. ............... 568/361 |
| 4,697,954 A | | 10/1987 | Grund ..................... 405/129.7 |
| 4,810,131 A | * | 3/1989 | Turner ..................... 405/129.5 |
| 4,846,604 A | * | 7/1989 | Holtmann ................ 405/129.5 |
| 5,000,618 A | | 3/1991 | Greenley ................. 405/129.7 |
| 5,056,960 A | | 10/1991 | Marienfeld ................. 405/270 |
| 5,092,709 A | * | 3/1992 | Davis ...................... 405/129.7 |
| 5,137,393 A | | 8/1992 | Fuhr et al. ............... 405/129.9 |
| 5,320,454 A | | 6/1994 | Walling ....................... 405/267 |
| 5,401,552 A | | 3/1995 | Bohrer et al. ................. 428/87 |
| RE35,272 E | | 6/1996 | Mathieson et al. ......... 428/213 |
| 5,544,976 A | | 8/1996 | Marchbanks ................. 340/626 |
| 5,582,310 A | * | 12/1996 | Del Zotto ................... 220/23.9 |
| 5,667,869 A | | 9/1997 | Beretta ........................ 428/131 |
| 5,728,424 A | | 3/1998 | Walling ....................... 427/180 |
| 5,846,024 A | * | 12/1998 | Mao et al. ................ 405/129.7 |
| 5,851,089 A | | 12/1998 | Beretta ..................... 405/259.1 |

OTHER PUBLICATIONS

Das, Braja M. Principles of Geotechnical Engineering, 1994, PWS Publishing Company, Third Edition, pp. 587, 592, 595–599.*

* cited by examiner

Primary Examiner—Thomas B. Will
Assistant Examiner—Tara L. Mayo
(74) Attorney, Agent, or Firm—Robert L. Wolter, Es; Beusse Brownlee Bowdoin & Wolter, P.

(57) ABSTRACT

A landfill (10) having a leachate collection apparatus including a layer of geonet material (40) disposed above a liner (38) as its primary leachate flow path. Leachate flows along the geonet material to a collection trench (16) located along an edge (14) of a generally planar landfill area (12). The superior hydraulic conductivity of the geonet material (34) disposed above a liner (32) is provided below the primary drainage layer for additional ground water protection. A collection box 918) having both a leachate collection compartment (54) and a leakage collection compartment (56) is disposed in alignment with openings (80, 82) formed in the respective liner layers. The sealing surfaces (64,68) between the collection box and liners are all located on upper surfaces of the collection box.

39 Claims, 6 Drawing Sheets

LANDFILL LEACHATE COLLECTION APPARATUS

BACKGROUND OF THE INVENTION

The present invention relates generally to a landfill, and more specifically to an apparatus for the collection of leachate from a landfill site, and specifically to a bottom liner and collection well apparatus for the containment and collection of leachate flowing from a landfill.

The protection of ground water is a primary concern in the design of a landfill. Many designs of containment and collection systems are known for preventing the leachate flowing from a landfill from contaminating the underlying substrate and underlying ground water sources. Such systems generally involve a liner or barrier layer of waterproof or low permeability material separating the landfill from the subjacent strata. The leachate is collected above the liner and directed to a series of conduits for drainage to a storage or treatment facility. It is known to provide a layer of granular material, such as sand or gravel, above the liner to function as a collection and drainage layer for the leachate. Because the hydraulic permeability of granular material is somewhat limited, typically between 0.01 and 0.00001 cm/sec, a series of lateral collection pipes are provided to collect the leachate from the granular layer and to direct it to a common collection header directed toward a storage or transport facility. The underlying strata and liner are typically sloped to allow the leachate to flow through the granular material to the lateral collection and header pipes. The lateral collection pipes and headers are perforated along their lengths to allow the leachate to flow out of the granular material and into the pipes. The lateral collection pipes are sloped toward the collection header, which is in turn sloped toward a collection sump. The collection pipe functions to direct the leachate flow from the plurality of lateral collection pipes to a common collection and discharge point.

It is also known to provide a second leakage collection and containment system operable to intercept any leachate escaping from a primary leachate collection apparatus. Such a secondary system may have lateral collection and header pipes similar to the leachate collection system. In a properly functioning leachate collection system, there would be very little flow in the secondary leakage collection apparatus. However, in the event of a failure of the primary leachate collection apparatus, the leakage collection apparatus will function to further protect the underlying strata by directing the leachate leakage to a proper disposal location. Monitoring for flow through the secondary leakage collection system provides an indication of the proper functioning or malfunctioning of the primary leachate collection system.

U.S. Pat. No. 5,092,709 issued on Mar. 3, 1992, to Davis, incorporated by reference herein, describes a typical prior art landfill leachate collection system. A liner impedes the passage of liquids between the landfill and a subjacent stratum. Appertured conduits embedded within a drainage material disposed above the liner convey the leachate to a gallery extending along the side of the landfill site. A secondary collection system is constructed below the primary liner. To support the functioning of the lateral conduits and the gallery, the floor of the site is graded to be saddle-shaped to encourage the leachate flow into the conduits, toward the galleries within the conduits, and within the galleries to low points where sumps are located. The cost of construction of such a landfill leachate collection apparatus is increased by the need for a complicated grading pattern and construction methods, and the need for a plurality of lateral collection conduits disposed across the width of the landfill.

BRIEF SUMMARY OF THE INVENTION

Thus, there is a particular need for a landfill leachate collection apparatus that is less expensive to construct than prior art systems. There is also a need for a leachate collection system that is easy to install and that has a minimum number of potential leak locations.

Accordingly, a leachate collection apparatus for a landfill disposed over a subjacent stratumis described herein as having: a lower liner disposed over the subjacent stratum; a leakage collection layer of geonet disposed over the lower liner; an upper liner disposed over the leakage collection layer of geonet; a leachate collection layer of geonet disposed over the upper liner; a layer of geotextile filter fabric disposed over the leachate collection layer of geonet; a leachate collection compartment having an upwardly facing inlet opening defined by a leachate collection compartment upper surface; a leakage collection compartment having an upwardly facing inlet opening defined by a leakage collection compartment upper surface; wherein the leachate collection compartment inlet opening is disposed below an opening formed in the upper liner and is in fluid communication with the leachate collection layer of geonet; and wherein the leakage collection compartment inlet opening is disposed below an opening formed in the lower liner and is in fluid communication with the leakage collection layer of geonet.

BRIEF DESCRIPTION OF THE INVENTION

The features and advantages of the present invention will become apparent from the following detailed description of the invention when read with the accompanying drawings in which.

DETAILED DESCRIPTION OF THE INVENTION

Figure 1:
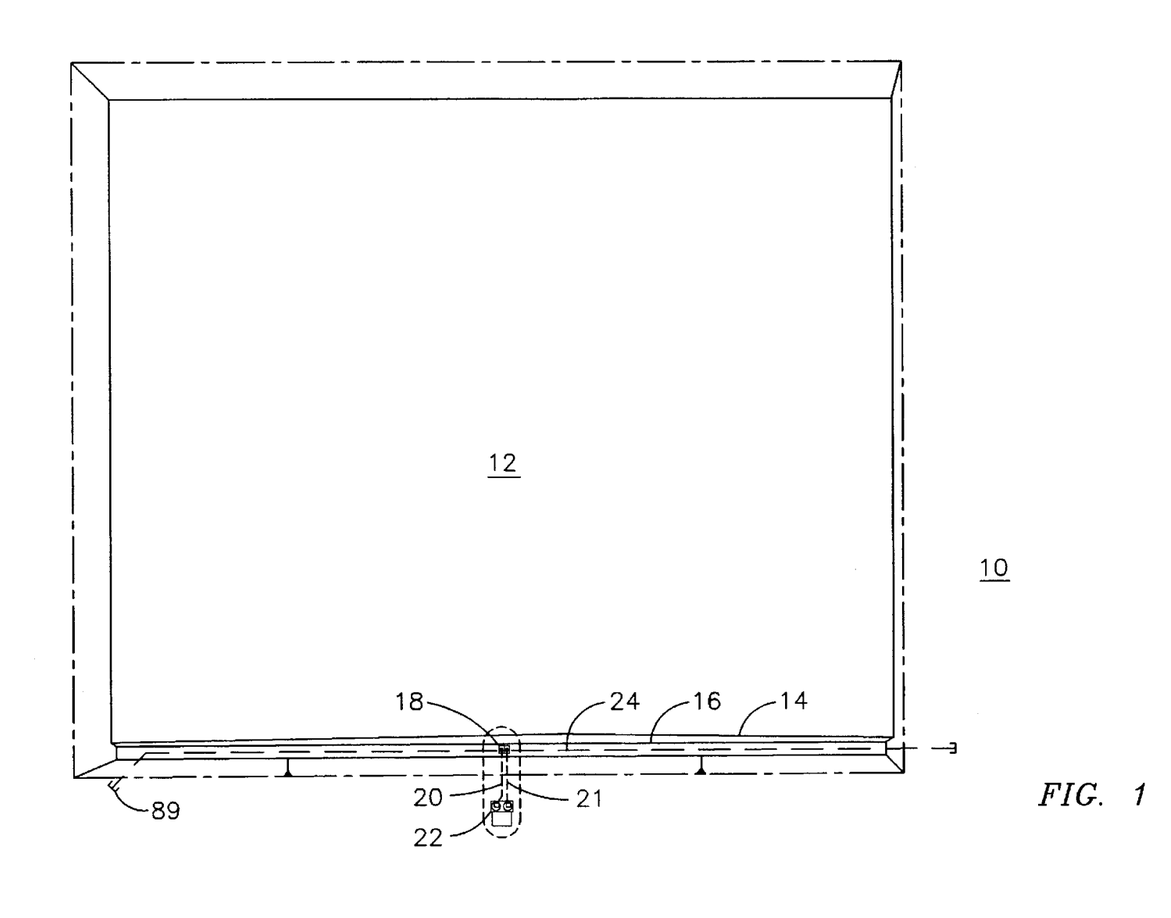
FIG. 1 is a plan view of a landfill built in accordance with this invention.

FIG. 1 illustrates a plan view of a landfill 10 built in accordance with the present invention. Landfill 10 has a generally planar portion 12 graded to have slope toward an edge 14. The slope may typically be approximately a one percent grade and is sufficient to urge the flow of leachate toward the edge 14. A trench 16 is formed along edge 14 for collecting the leachate flowing from the generally planar area 12. The edge 14 and trench 16 are illustrated as being located along a side of landfill 10, although it may be appreciated that a trench 16 and associated edge may be formed at any point within the landfill area 10. For example, landfill 10 of FIG. 1 could be extended by forming another generally planar area (not shown) on an opposed side of trench 16 as a mirror image of generally planar area 12. In such an embodiment, trench 16 would appear to bisect the landfill and would be operative to receive leachate flow from both generally planar areas across mirror image edges.

A collection vessel such as collection box 18 is disposed within the trench 16 for the collection of the leachate flow for subsequent conveyance through pipes 20,21 to sump 22. A perforated pipe 24 is disposed within trench 16 and is in fluid communication with the collection box 18. From the perspective of FIG. 1, it is apparent that the landfill 10 differs from prior art designs by its lack of lateral collection pipes and its lack of a complicated saddle-shaped grading plan. The leakage collection apparatus enabling such a simple landfill design is described more fully below.

Figure 2:
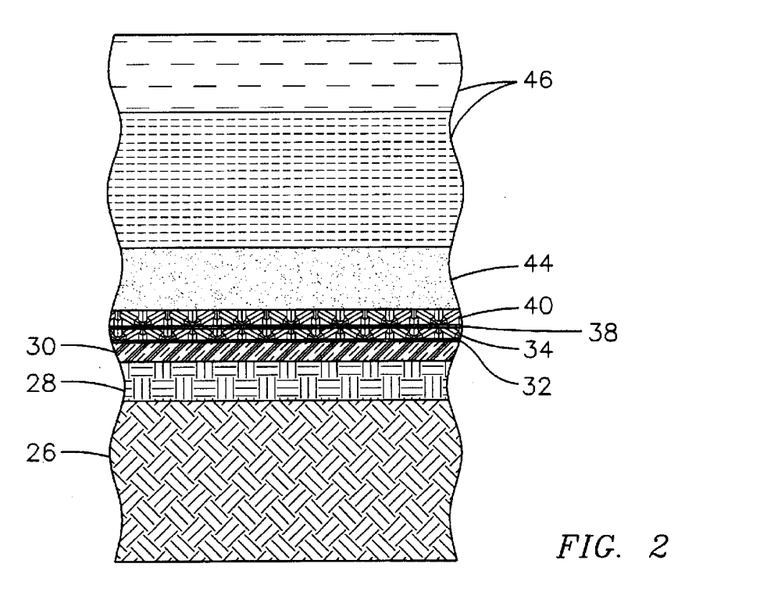
FIG. 2 is a cross-sectional view of the landfill of FIG. 1 as viewed in the generally planar portion of the landfill.

FIG. 2 illustrates a cross section through the landfill 10 of FIG. 1 as viewed in the generally planar portion 12 and illustrating the various layers of materials forming the landfill. The existing subjacent ground layer 26 may be covered by a layer of compacted subgrade 28 and a layer of compacted clay 30 or other material having a low hydraulic conductivity. A first or lower liner 32 is disposed over the subjacent stratum 26, 28, 30. The liner may be, for example, a 0.06 inch thick high density polyethylene (HDPE) geomembrane. Any other known liner may be used provided that it is chemically resistant to the waste and leachate and is adequately rugged. For example, polyvinyl chloride (PVC), butyl rubber (IIR), ethylene propylene diene terpolymer (EPDM), etc. may be used. A leakage collection layer of geonet 34 is disposed over the lower liner 32. The term "geonet" is used herein to describe any mesh product having a high transmissivity or void space percentage. Since a primary function of a geonet is to convey liquid within the plane of its structure, the in-plane hydraulic flow rate, or transmissivity, is of major importance. The leakage collection layer of geonet 34 may preferably have a hydraulic transmissivity ranging from 5 to 50 gal/min/ft. One such product is sold under the trademark TENDRAIN by Tenax Corporation.

Disposed above the leakage collection layer of geonet 34 is an upper liner 38. Disposed above the liner 38 is a geocomposite layer 36 consisting of two joined layers: a leachate collection layer of geonet 40, and a layer of geotextile filter fabric 42. One such geocomposite material 36 is sold by Tenax Corporation under the brand name TENDRAIN. The upper liner 38 may be a material similar to the lower liner 32. The leachate collection layer of geonet 40 may also have a hydraulic transmissivity ranging from 5 to 50 gal/min/ft. The layer of geotextile filter fabric 42 is any such material known in the art operable to prevent the migration of small particles into the layer of geonet 34 while still allowing leachate to flow there through. Layers 40, 42 may be installed separately or installed as a single geocomposite material 36. The layer of geotextile filter fabric 42 may not be required in all applications, depending upon the expected quantity and rate of migration of small particles into the layer of geonet 34.

Above the geocomposite layer 36 is disposed a layer of drainage media such as sand, pea gavel, or any other porous or granulated material that is chemically resistant to the waste and leachate. Above the drainage media 44 is then disposed one or more layers of solid waste 46. Leachate, such as rain water, percolating through the solid waste 46 is collected by the upper liner 38 and flows through the leachate collection layer of geonet 40 along the slope of the generally planar portion 12 of landfill 10 toward trench 16. The inventor has found that the high hydraulic transmissivity or conductivity provided by a geonet product will prevent any undesirable buildup of hydraulic head on the upper liner 38 and in the drainage media 44, thereby precluding the need for any lateral collection pipes. In one embodiment, a drainage length of over 450 feet in the direction of the slope of the generally planar area 12 was successfully drained toward edge 14 without the need for lateral collection pipes. The width of the landfill 10 in a direction perpendicular to the slope of the generally planar area 12 may be made to any desired dimension, but in one embodiment was constructed to be over 750 feet. Thus, it was found that a total area of 337,500 square feet could be drained without the need for any lateral drainage pipe.

Figures 3, 3A:
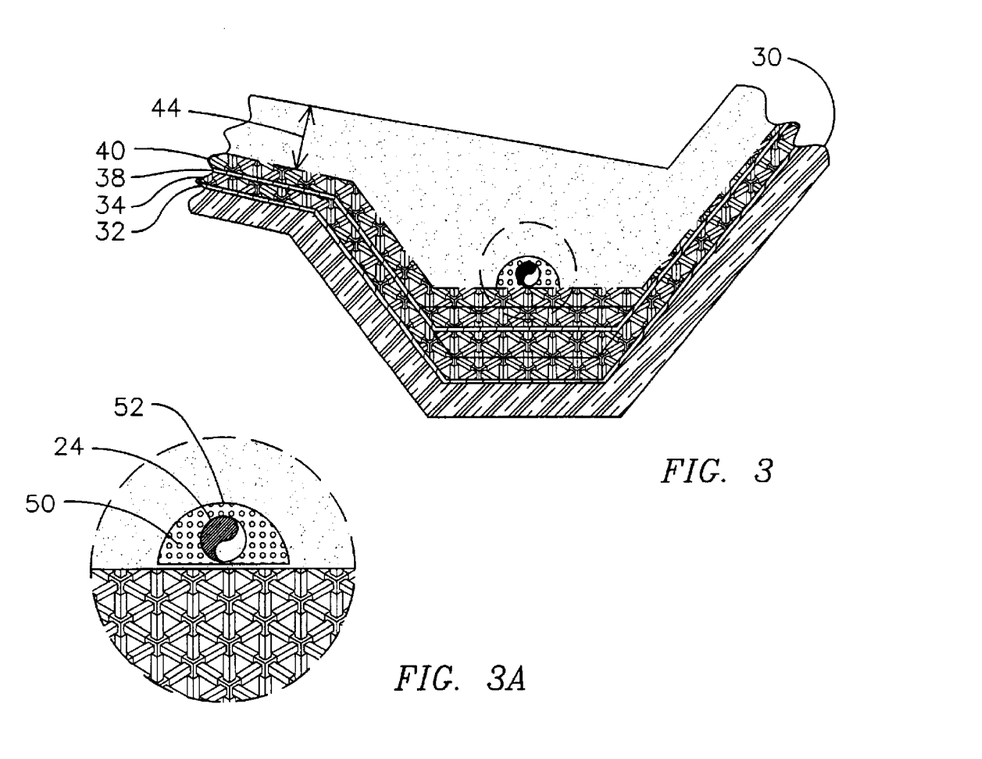
FIG. 3 is a cross-sectional view of the landfill of FIG. 1 as viewed in the trench portion of the landfill.
FIG. 3A is an enlargement of a pipe section shown in FIG. 3

FIG. 3 illustrates a cross-section through trench 16 to illustrate the various layers of material and the location of perforated pipe 24. Each of the various layers illustrated in FIG. 2 are shown as extending into a trench 16 having a generally trapezoidal, "V" or "U" shape. Note that the thicknesses of the leachate collection layer of geonet 40 and the leakage collection layer of geonet 34 are preferably greater within the area of the trench 16 than within the generally planar area 12. This additional thickness may be as much as two to four times the thickness in the generally planar area 12. Such additional thickness is preferred to ensure that the total flow of leachate from the generally planar area 12 can be accommodated as it accumulates within the trench 16. Trench 16, and the associated drainage layers, are generally sloped towards collection box 18, such as at a 0.5% grade. One may appreciate that an additional thickness of geonet is provided in order to ensure adequate drainage within the trench 16 since the total volume of flow increases as the flow nears the collection box 18. Furthermore, it is desirable to have excessive flow area available to accommodate the flow of leachate in the event of an unplanned localized flow blockage. The additional thickness of geonet may be provided by installing multiple layers of geonet to form the leachate collection layer 40 and the leakage layer 34.

FIG. 3 also illustrates a perforated pipe 24 disposed above the leachate collection layer geocomposite 36 within the trench 16. The perforated pipe 24 extends along the length of the trench 16 and has an outlet in fluid communication with the collection box 18. Perforated pipe 24 may be covered by a layer of granular material, such as river run gravel 50 sealed with a layer of geotextile fabric 52. Perforated pipe 24 serves as a supplemental flow path in event that the total flow rate of leachate exceeds the capacity of the leachate collection layer of geonet 40. Perforated pipe 24 also serves as an access port for inspection and cleaning activities associated with collection box 18, as will be described more fully below.

Figures 4, 4A:
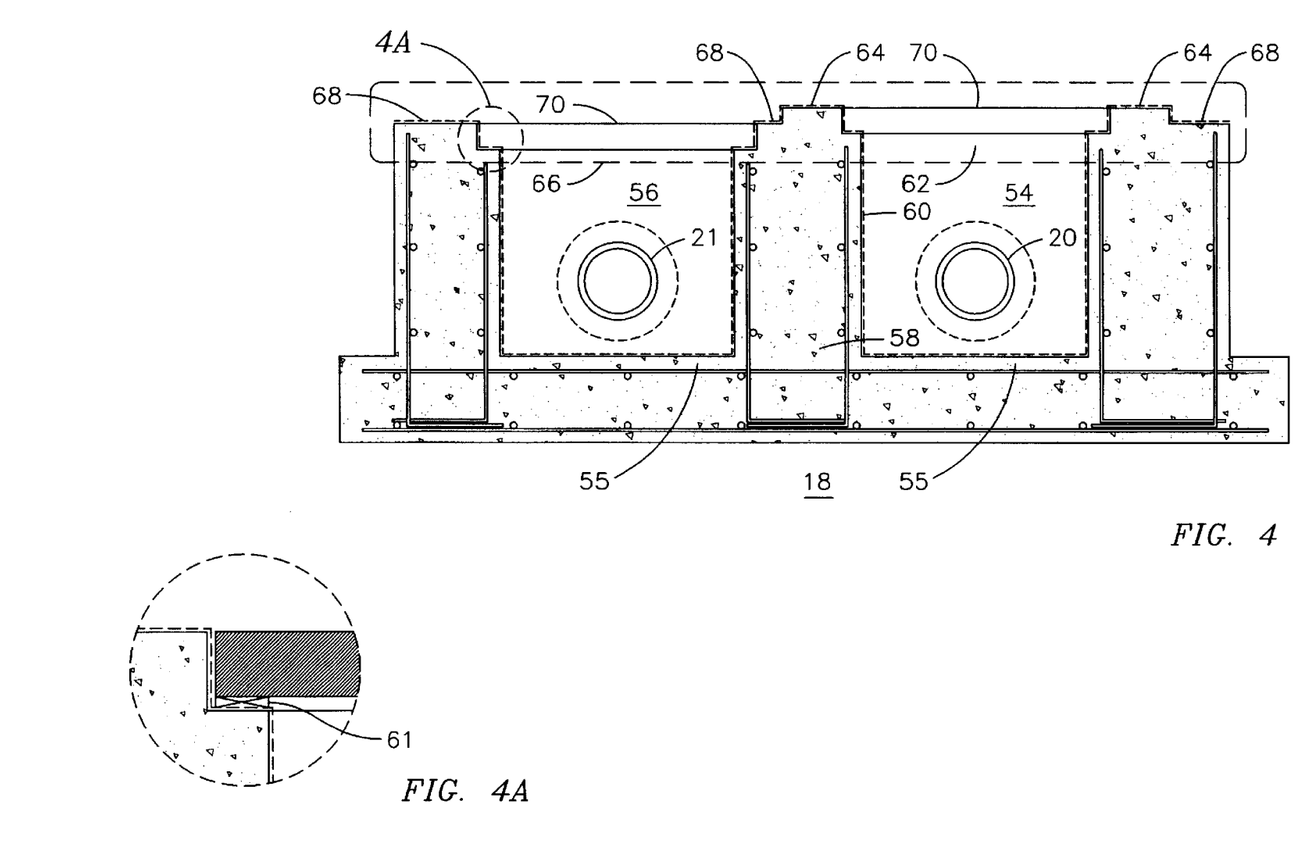
FIG. 4 is a cross-sectional view of the collection box of the landfill of FIG. 1.
FIG. 4A is an enlargement of a grate section on the collection box shown in FIG. 4.

FIG. 4 illustrates a cross-sectional view of collection box 18. Collection box 18 includes a leachate collection compartment 54 and a leakage collection compartment 56. Although these two compartments may be manufactured and/or installed as separate units, a preferred design incorporates both compartments into a single collection box 18 having a common wall 58 forming a portion of both leachate collection compartment 54 and leakage collection compartment 56. Collection box 18 may be formed of any sufficiently rugged material, and is illustrated as being formed of reinforced concrete having a liner 60 disposed over the interior of both the leachate collection compartment 54 and the leakage collection compartment 56. Other embodiments may include a plastic, steel, polyethylene or fiberglass material, and may not require a separate waterproof liner. Each of the leachate collection compartment 54 and leakage collection compartment 56 includes a bottom 55 and a plurality of walls, including common wall 58. Leachate collection compartment 54 includes an upwardly facing inlet opening 62 defined by a leachate collection compartment upper surface 64. Similarly, leakage collection compartment 56 includes an upwardly facing inlet opening 66 defined by a leakage compartment upper surface 68. The upwardly facing leakage compartment upper surface 68 may be a planar or a non-planar surface, or a surface that is horizontal or is angled from horizontal. As will be apparent with regard to a later description of the welding of a seal along the upwardly facing sealing surface, it is desired to eliminate any overhang that might present an obstacle to a liner welding operation being performed on this surface. Thus, the term upwardly facing may include any surface angled less than ninety degrees from horizontal, but it is preferred that the surface be generally planar and generally horizontal. Liner 60 extends over at least a portion of each of the leachate collection compartment upper surface 64 and the leakage collection compartment upper surface 68 to form respective sealing surfaces. These sealing surfaces are advantageously located on upper surfaces of collection box 18 in order to facilitate the installation of the connection between the collection box 18 and the liners 32,38 as more fully described below. Drainage pipes 20, 21 extend into the leachate collection compartment and leakage collection compartment 56 respectively. Although these pipe connections may be made in a number of ways, a preferred design incorporates wall pipes that are an integral part of the collection box 18. A removable grate 70 is disposed across each of the inlet openings 62, 66, and is disposed above the liner 60 so that it may be removed without disturbing the membrane 60. Such grates 70 may be fabricated from stainless steel or other material having sufficient strength and chemical compatibility with the environment. A frame 61 may be placed between the grate 70 and liner 60 to protect the membrane from abrasion and to distribute the structural loads from the grate 70 to the collection box 18.

Figure 5:
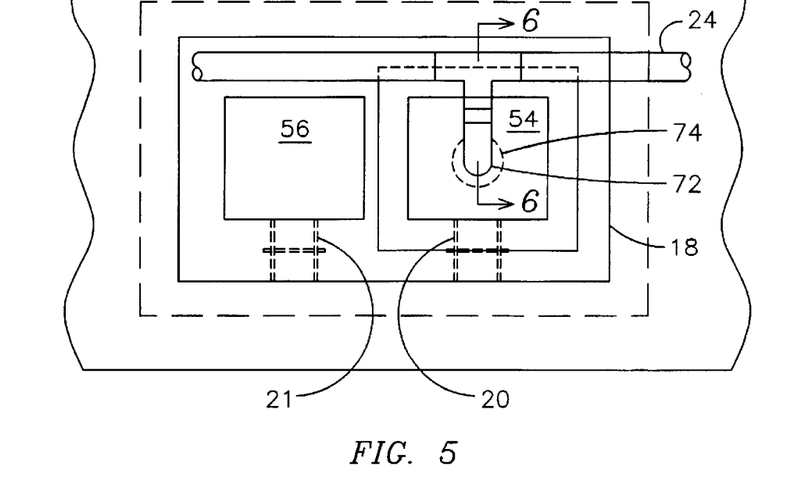
FIG. 5 is a top view of the collection box of the landfill of FIG. 1.
Figure 6:
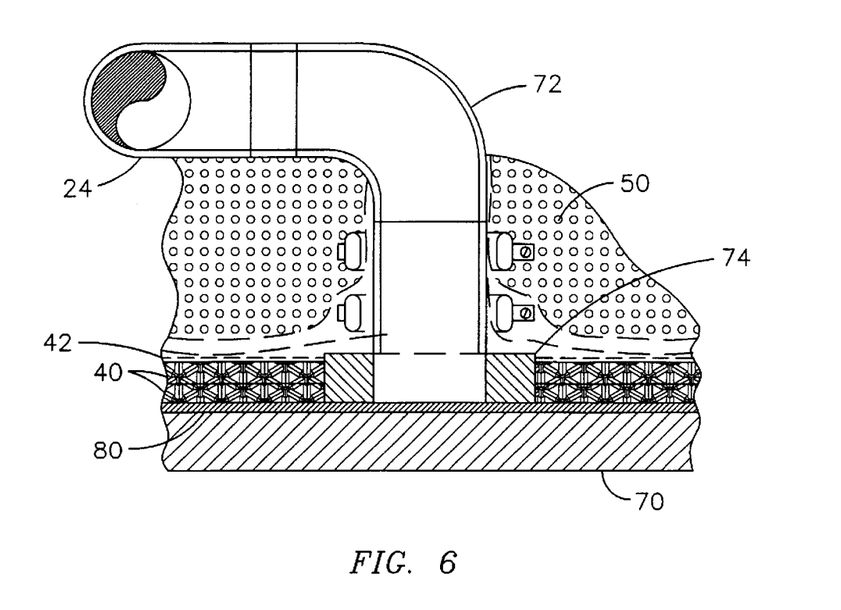
FIG. 6 is a cross-sectional view, taken along lines 6—6 of FIG. 5, of the connection between the perforated pipe and the collection box of the landfill of FIG. 1.

FIG. 5 illustrates a top view of collection box 18 showing the generally rectangular shape of the inlet openings of leachate collection compartment 54 and leakage collection compartment 56. Other shapes may be used and the size of the respective compartments 54,56 need not be identical. Also illustrated in FIG. 5 is the fluid connection between perforated pipe 24 and leachate collection compartment 54. This connection is illustrated in more detail in FIG. 6 which is a cross-sectional view taken along section A—A of FIG. 5. As shown in both FIGS. 5 and 6, perforated pipe 24 is connected to an elbow section 72 which is secured to a flange or ring 74 disposed over grate 70. Ring 74 may be formed of HDPE material which is, in turn, sealingly connected to elbow 72, such as by any known welding process as is commonly used in the interconnection of plastic parts.

Figure 7:
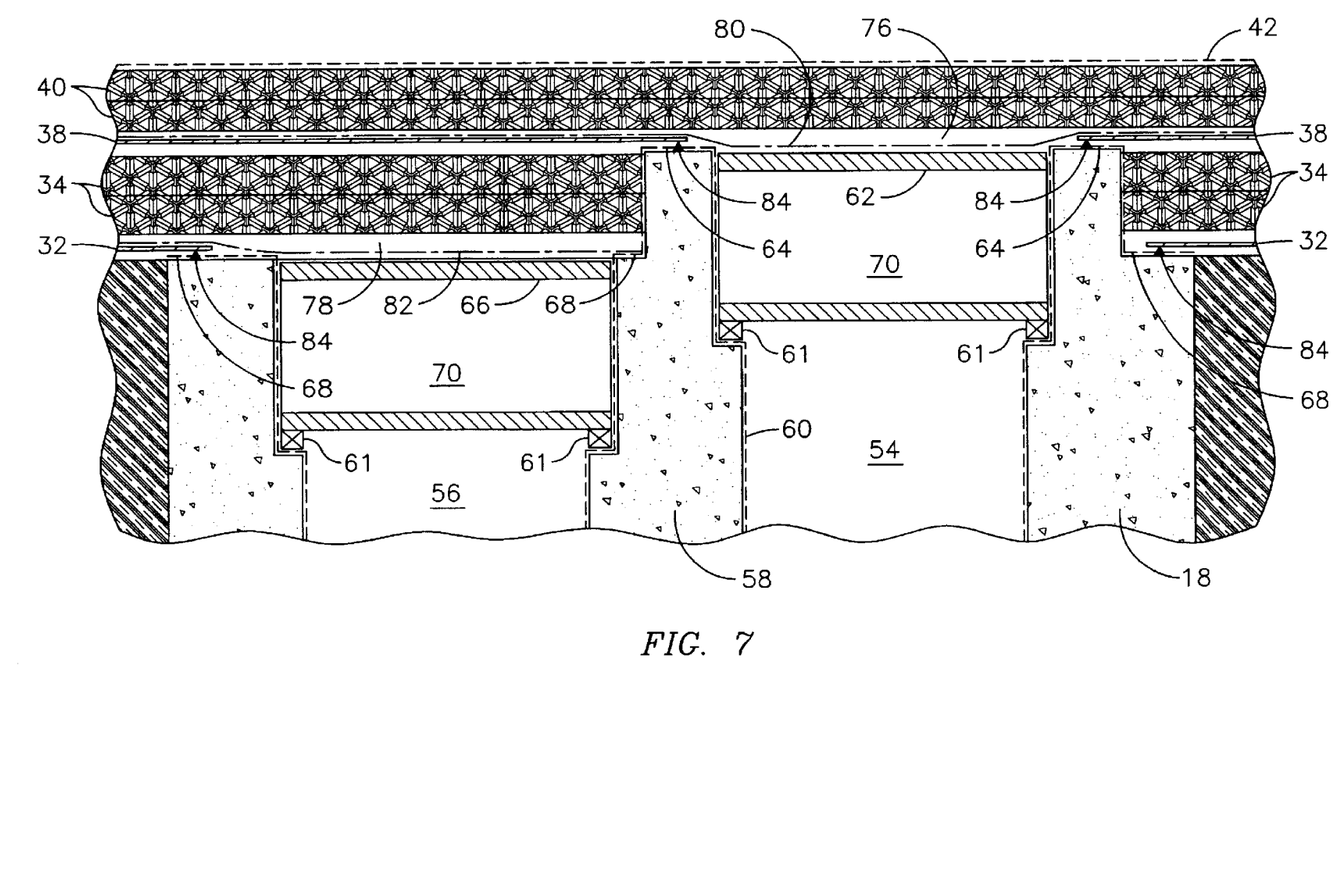
FIG. 7 is a partial cross-sectional view of the collection box of the landfill of FIG. 1 showing it interface with the layers of material forming the landfill liner.

FIG. 7 illustrates a cross-sectional view of collection box 18 and the respective fluid flow paths from the leachate collection layer of geonet 40 and the leakage collection layer of geonet 34. An opening 76 is formed in the upper liner 38 in alignment with the inlet opening 62 of leachate collection compartment 54. Such an opening may be formed by simply cutting the liner 38 after the collection box 18 and liner 38 are set in place in the landfill 10. Opening 76 allows leachate that is flowing along the leachate collection layer of geonet 40 to flow downward into the leachate collection compartment 54 through grate 70 and opening 62. In order to minimize the sagging of the leachate collection layer of geonet 40 into the openings of grate 70, a layer of geogrid material 80 is disposed across opening 76. One such geogrid material is provided by Tensar Corporation and consists of a polyethylene reinforcing mat. Similarly, an opening 78 is formed in the lower liner 32 to align with the inlet opening 66 of leakage collection compartment 56. A layer of geogrid material 82 may also be used across opening 66 above grate 70.

Proper functioning of landfill 10 depends upon having an impervious seal between the collection box 18 and the respective liners 32,38. Seal 84 is formed between upper liner 38 and the collection box liner 60 along the upper surface 64 of leachate collection compartment 54. Similarly, a seal 84 is formed along the upper surface 68 of the leakage collection compartment 56. Such seals 84 may be formed by placing an adhesive material between the respective adjoining surfaces, or may preferably be formed by a welding process as is known in the art for welding the respective HDPE membrane materials. Seals 84 provide a watertight barrier for the control of the flow of leachate into the respective collection compartments 54, 56. The inventor has found that by forming collection box 18 to have sealing surfaces 64, 68 along its upwardly facing surfaces, the field installation of seals 84 is greatly simplified, thereby lowering costs and improving the likelihood that a watertight seal will be formed. The top surface location of seals 84 also facilitates the testing of the seals, such as by vacuum box testing or by blowing compressed air onto the seal and visually watching for movement of the respective membranes 32, 38, 60 thereby indicating the flow of air under the membranes. Prior art landfill designs typically collect the leachate from above the liner in a collection pipe, then direct the collection pipe through the liner to a collection box or sump. Such designs required the field installation of a seal between the collection pipe and the liner, which involved manipulating a sealing mechanism a full 360 degrees around the obstruction of the pipe. The inventor has found that by this difficult to perform pipe-liner seal may be eliminated by placing collection box 18 directly under an opening 62 formed in the liner 38, thereby allowing the seal 84 to be formed along the upwardly facing sealing surface 64 which is free from obstructions.

As can be seen in FIG. 7, leakage collection compartment upper surface 68 is formed to be at an elevation lower than that of the leachate collection compartment upper surface 64 by a distance generally corresponding to the thickness of the leakage collection layer of geonet 34. As a result, the portion of the upper liner 38 and leachate collection layer of geonet 40 disposed over the leakage collection compartment inlet 66 will lie essentially flat.

During normal operation of landfill 10, leachate flowing from the solid waste layers 46 will percolate through drainage layer 44 into the leachate collection layer of geonet 40, and will thereby flow along the slope of generally planar area 12 toward trench 16. Once in trench 16, the leachate flow continues along the downward slope of trench 16 toward collection box 18 through an increasingly thick cross-section of leachate collection layer of geonet 40. The thickness of the leachate collection layer of geonet 40 may be at its maximum directly above collection box 18. Upon reaching collection box 18, the leachate will flow through openings 76, 62 into the leachate collection compartment 54. Once a sufficient volume of leachate has collected within the leachate collection compartment 54, the leachate will flow through pipe 20 to sump 22, where it can be removed for offsite treatment and/or storage by pumping or gravity flow. During periods of extremely high leachate flow, a portion of the leachate may flow through perforated pipe 24 and into leachate collection compartment 54, thereby bypassing a portion of the leachate collection layer of geonet 40 within trench 16. In the event of any leakage through the upper liner 38, a redundant flow path to sump 22 is provided by leakage collection layer of geonet 34, openings 66, 78, leakage collection compartment 56, and pipe 21. Appropriate instrumentation may be provided at any point along the redundant flow path in order to provide an indication of a leak in the primary leachate collection flow path. An upper end 89 of perforated pipe 24, as illustrated in FIG. 1, may be utilized as an access for cleaning or inspecting perforated pipe 24 and/or leachate collection compartment 54.

Figure 8:
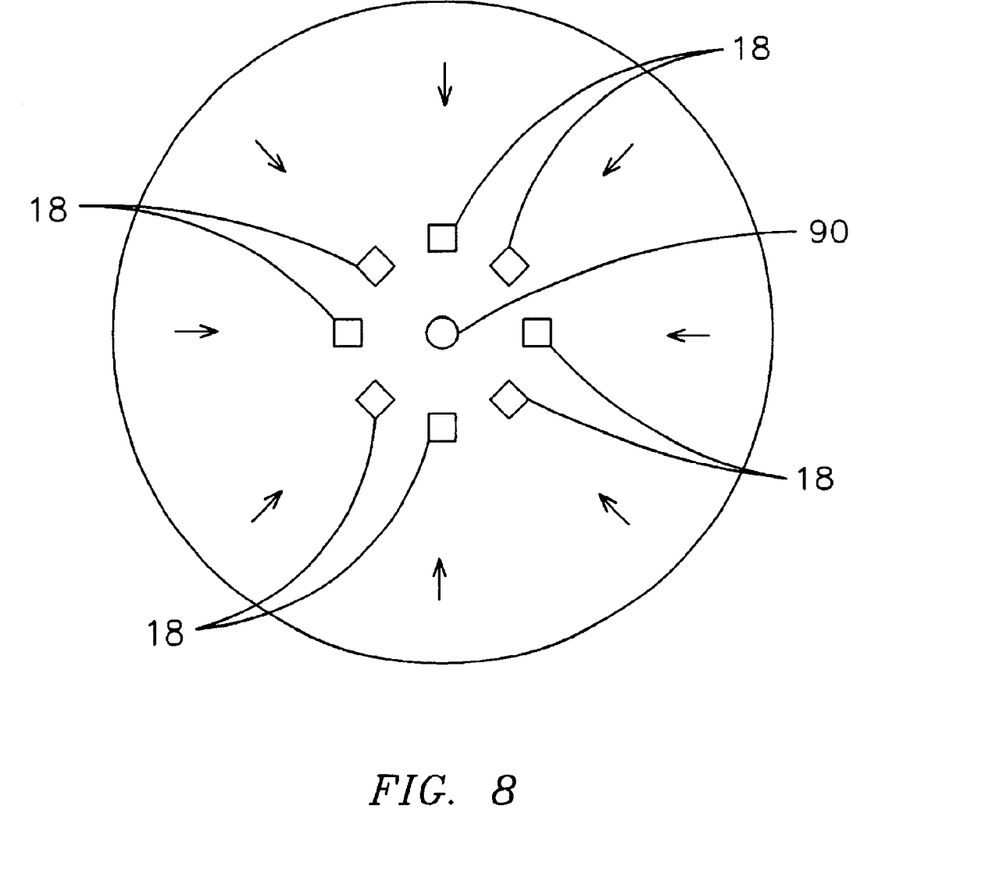
FIG. 8 is a top view of a landfill utilizing only a single liner drained to a plurality of collection boxes.

While the preferred embodiments of the present invention have been shown and described herein, it will be obvious that such embodiments are provided by way of example only. Numerous variations, changes and substitutions will occur to those of skill in the art without departing from the invention therein. For example, an alternative embodiment of a landfill may not include a leakage collection apparatus, but rather may rely upon the proper functioning of the upper liner 38, leachate collection layer of geonet 40 and associated structures. Generally, for such single liner systems, regulators will require a thicker underlying clay layer and a thicker liner than with a double liner system. Furthermore, another embodiment, illustrated in FIG. 8, may not use a trench 16 or perforated pipe 24, but instead relies upon having the slope of the geocomposite 36 being disposed directly toward the collection box 18. In the embodiment of FIG. 8, the landfill grade has a funnel shape with a plurality of collection boxes 18 located proximate the center of the landfill. The respective collection boxes 18 may be drained to a common sump 90 for subsequent pumping to an remote processing facility 92. In another embodiment, the collection box 18 may be formed as a pipe having a flanged end, with the flange forming an upwardly facing sealing surface. In such an embodiment, the pipe may be aligned with an outlet opening formed in the liner, and the edges of the liner surrounding the opening may be compressed between two mating flange portions. Accordingly, it is intended that the invention be limited only by the spirit and scope of the appended claims.

I claim as my invention:

1. A leachate collection apparatus for a landfill disposed over a subjacent stratum, the leachate collection apparatus comprising:
   - a lower liner disposed over the subjacent stratum;
   - a leakage collection layer of geonet disposed over the lower liner;
   - an upper liner disposed over the leakage collection layer of geonet;
   - a leachate collection layer of geonet disposed over the upper liner;
   - a layer of geotextile filter fabric disposed over the leachate collection layer of geonet;
   - a leachate collection compartment having an upwardly facing inlet opening defined by a leachate collection compartment upper surface;
   - a leakage collection compartment having an upwardly facing inlet opening defined by a leakage collection compartment upper surface;
   - wherein the leachate collection compartment inlet opening is disposed below an opening formed in the upper liner and is in fluid communication with the leachate collection layer of geonet; and
   - wherein the leakage collection compartment inlet opening is disposed below an opening formed in the lower liner and is in fluid communication with the leakage collection layer of geonet.

2. The apparatus of claim 1, further comprising:
   - each of the leachate collection compartment and the leakage collection compartment having a waterproof surface extending to its respective upper surface;
   - a seal formed between the leachate collection compartment waterproof surface and the upper liner along the leachate collection compartment upper surface; and
   - a seal formed between the leakage collection compartment waterproof surface and the lower liner along the leakage collection compartment upper surface.

3. The apparatus of claim 1, further comprising:
   - a seal formed between the leachate collection compartment upper surface and the upper liner; and
   - a seal formed between the leakage collection compartment upper surface and the lower liner.

4. The apparatus of claim 1, further comprising:
   - each of the leachate collection compartment and the leakage collection compartment comprising a liner disposed over inner surfaces of the respective compartments and extending over the respective upper surfaces;
   - a seal formed between the leachate collection compartment liner and the upper liner along the leachate collection compartment upper surface; and
   - a seal formed between the leakage collection compartment liner and the lower liner along the leakage collection compartment upper surface.

5. The apparatus of claim 1, further comprising:
   - the leakage collection compartment upper surface being formed at an elevation lower than the leachate collection compartment upper surface by a distance corresponding to a thickness of the leakage collection layer of geonet so that a portion of the upper liner and leachate collection layer of geonet disposed over the leakage collection compartment inlet lies essentially flat.

6. The apparatus of claim 1, further comprising:
   - each of the lower and upper liners, leakage collection layer of geonet, and leachate collection layer of geonet having a first portion disposed in a plane having a slope directed downward toward an edge; and
   - the leachate collection compartment and the leakage collection compartment being disposed proximate the edge.

7. The apparatus of claim 6, further comprising:
   - each of the lower and upper liners, leakage collection layer of geonet, and leachate collection layer of geonet having a second portion forming a trench proximate the edge; and
   - the openings formed in the upper and lower liners being disposed within the trench.

8. The apparatus of claim 7, further comprising:
   - a perforated pipe disposed above the leachate collection layer of geonet within the trench and extending along a length of the trench, the perforated pipe having an outlet end in fluid communication with the leachate collection compartment.

9. The apparatus of claim 7, wherein a thickness of the leachate collection layer of geonet in the second portion is greater than a thickness of the leachate collection layer of geonet in the first portion.

10. The apparatus of claim 1, wherein the leachate collection layer of geonet comprises a hydraulic transmissivity between 5–50 gal/min/ft.

11. The apparatus of claim 1, further comprising a grate disposed over each of the leachate collection compartment inlet opening and the leakage collection compartment inlet opening.

12. The apparatus of claim 11, further comprising a layer of geogrid disposed above each of the grates.

13. The apparatus of claim 1, wherein the leachate collection compartment and the leakage collection compartment each comprise a common wall of a single collection vessel.

14. A collection vessel for a landfill leachate collection apparatus, the landfill leachate collection apparatus including a leachate collection portion and a leakage collection portion, the collection vessel comprising:
   a leachate collection compartment comprising a bottom and a plurality of walls defining an interior surface, and an upwardly facing inlet, through which leachate flows from said leachate collection portion into said collection compartment and said inlet, having an upper sealing surface adapted for sealing connection with the leachate collection portion; and
   a leakage collection department comprising a bottom and a plurality of walls defining an interior surface, and an upwardly facing inlet opening having an upper sealing surface adapted for sealing connection with the leakage collection portion; and,
   a grate disposed across each of the leachate collection compartment and leakage collection compartment inlet openings.

15. The collection vessel of claim 14, further comprising a layer of geogrid disposed over each of the grates.

16. The collection vessel of claim 16, wherein the plurality of walls of the leachate collection compartment and the plurality of walls of the leakage collection compartment include a common wall.

17. The collection vessel of claim 14, further comprising a liner disposed over the leachate collection compartment interior surface and extending over the leachate collection compartment upper sealing surface.

18. The collection vessel of claim 14, further comprising a liner disposed over both the leachate collection compartment interior surface and the leakage collection compartment interior surface and extending over at least a portion of each of the leachate collection compartment and leakage collection compartment upper sealing surfaces.

19. A landfill comprising:
   a ground stratum having a generally planar portion graded to have a slope toward an edge and having a trench formed along the edge;
   a lower liner disposed above the generally planar portion and trench;
   a leakage collection layer of geonet disposed over the lower liner;
   an upper liner disposed over the leakage collection layer of geonet;
   a leachate collection layer of geonet disposed over the upper liner;
   a layer of geotextile filter fabric disposed over the leachate collection layer of geonet;
   a layer of drainage media disposed over the layer of geotextile filter fabric;
   a layer of solid waste disposed over the layer of drainage media;
   a leachate collection compartment having an upwardly facing inlet opening defined by a leachate collection compartment upper surface;
   a leakage collection compartment having an upwardly facing inlet opening defined by a leakage collection compartment upper surface;
   wherein the leachate collection compartment inlet opening is disposed below an opening formed in the upper liner within the trench and is in fluid communication with the leachate collection layer of geonet; and
   wherein the leakage collection compartment inlet opening is disposed below an opening formed in the lower liner within the trench and is in fluid communication with the leakage collection layer of geonet.

20. The landfill of claim 19, further comprising a perforated pipe disposed above the leachate collection layer of geonet within the trench and extending along a length of the trench, the perforated pipe having an outlet end in fluid communication with the leachate collection compartment.

21. The landfill of claim 19, wherein a thickness of the leachate collection layer of geonet within the trench is greater than a thickness of the leachate collection layer of geonet above the generally planar portion.

22. The landfill of claim 21, wherein a thickness of the leachate collection layer of geonet proximate the leachate collection compartment inlet is greater than a thickness of the leachate collection layer of geonet above the generally planar area.

23. The landfill of claim 19, further comprising:
   a seal formed between the upper liner and the leachate collection compartment along the leachate collection compartment upper surface; and
   a seal formed between the lower liner and the leakage collection compartment along the leakage collection compartment upper surface.

24. The landfill of claim 19, further comprising:
   each of the leachate collection compartment and the leakage collection compartment comprising a liner disposed over respective compartment inner surfaces and extending to the respective compartment upper surfaces;
   a seal formed between the leachate collection compartment liner and the upper liner along the leachate collection compartment upper surface; and
   a seal formed between the leakage collection compartment liner and the lower liner along the leakage collection compartment upper surface.

25. The landfill of claim 19, wherein the leachate collection layer of geonet comprises a hydraulic transmissivity between 5–50 gal/min/ft.

26. The landfill of claim 19, further comprising a grate disposed across each of the leachate collection compartment inlet opening and the leakage collection compartment inlet opening.

27. The landfill of claim 26, further comprising a layer of geogrid disposed over each of the grates.

28. A leachate collection apparatus for a landfill disposed over a subjacent stratum, the leachate collection apparatus comprising:
   an upper liner disposed over the subjacent stratum;
   a leachate collection layer of geonet disposed over the upper liner;

a leachate collection compartment having an upwardly facing inlet opening defined by a leachate collection compartment upper surface, and said compartment having a bottom and a plurality of walls connected to said bottom and upper surface, defining an interior of the compartment isolated from said stratum;

wherein the leachate collection compartment inlet opening is disposed below an opening formed in the upper liner and is in fluid communication with the leachate collection layer of geonet.

29. The leachate collection apparatus of claim 28, further comprising:

a plurality of leachate collection compartments each having an upwardly facing inlet opening defined by a leachate collection compartment upper surface;

wherein the leachate collection compartment inlet openings are disposed below respective openings formed in the upper liner and are in fluid communication with the leachate collection layer of geonet.

30. The leachate collection apparatus of claim 28, further comprising a seal formed between the leachate collection compartment upper surface and the upper liner.

31. The leachate collection apparatus of claim 28, further comprising:

each of the upper liner and leachate collection layer of geonet having a portion forming a trench, and the opening formed in the upper liner being disposed within the trench.

32. The leachate collection apparatus of claim 31, further comprising a perforated pipe disposed above the liner within the trench and having an outlet end in fluid communication with the leachate collection compartment.

33. The leachate collection apparatus of claim 28, further comprising a layer of geotextile filter fabric disposed over the leachate collection layer of geonet.

34. The leachate collection apparatus of claim 28, further comprising:

a lower liner disposed between the upper liner and the subjacent stratum;

a leakage collection layer of geonet disposed between the lower liner and the upper liner;

a leakage collection compartment having an upwardly facing inlet opening defined by a leakage collection compartment upper surface; and wherein the leakage collection compartment inlet opening is disposed below an opening formed in the lower liner and is in fluid communication with the leakage collection layer of geonet.

35. The leachate collection apparatus of claim 34, wherein the leachate collection compartment and the leakage collection compartment are formed as an integral unit.

36. A collection vessel for a landfill, the landfill including a leachate collection liner having an outlet opening formed therein, the collection vessel comprising:

a leachate collection compartment, having a plurality of walls and a bottom, defining an interior of the compartment isolated from a structure subjacent said landfill;

an inlet opening, through which leachate flows over said leachate liner and into said leachate collection compartment, formed in the leachate collection compartment and adapted for alignment with the collection liner outlet opening; and an upwardly facing sealing surface disposed about the inlet opening and adapted for forming a seal thereon.

37. The collection vessel of claim 36, further comprising:

a collection compartment liner disposed in the collection compartment and extending onto the upwardly facing sealing surface; and a seal attached to the collection compartment liner about the inlet opening and adapted for forming a sealing connection with the leachate collection liner.

38. A landfill leachate collection apparatus comprising:

a liner adapted for being disposed over a subjacent stratum;

an outlet opening formed in the liner;

a collection apparatus having an inlet aligned below the liner outlet opening, through which leachate flows into said collection apparatus over said liner, and having an upwardly facing sealing surface disposed about the inlet, and said collection apparatus having a bottom connected to a plurality of upright walls, defining an interior of the compartment isolated from said subjacent stratum; and a seal formed between the liner and the collection apparatus on the upwardly facing sealing surface.

39. The apparatus of claim 38, further comprising a leachate collection layer of geonet disposed above the liner.

* * * * *